(12) United States Patent
Petzl et al.

(10) Patent No.: US 8,016,073 B2
(45) Date of Patent: Sep. 13, 2011

(54) CARABINER WITH AUTOMATIC LOCKING

(75) Inventors: Paul Petzl, Barraux (FR); Christian Broquerie, Fontaine (FR)

(73) Assignee: Zedel, Crolles (FR)

( * ) Notice: Subject to any disclaimer, the term of this patent is extended or adjusted under 35 U.S.C. 154(b) by 575 days.

(21) Appl. No.: 11/391,250

(22) Filed: Mar. 29, 2006

(65) Prior Publication Data

US 2006/0219479 A1 Oct. 5, 2006

(30) Foreign Application Priority Data

Apr. 5, 2005 (FR) ..................................... 05 03367

(51) Int. Cl.
*A62B 35/00* (2006.01)
(52) U.S. Cl. ........................................... 182/3; 24/600.2
(58) Field of Classification Search ...... 24/599.5–599.7, 24/600.2, 600.1; 182/3, 30
See application file for complete search history.

(56) References Cited

U.S. PATENT DOCUMENTS

| | | | | |
|---|---|---|---|---|
| 1,007,213 A | * | 10/1911 | Iau | 24/599.5 |
| 1,291,673 A | * | 1/1919 | Robinson | 294/82.21 |
| 1,411,549 A | * | 4/1922 | Abbott | 294/82.21 |
| 1,849,816 A | * | 3/1932 | Yingling | 294/82.2 |
| 2,387,617 A | * | 10/1945 | Schmidt et al. | 568/338 |
| 4,358,880 A | * | 11/1982 | Garcia | 24/600.2 |
| 4,528,729 A | * | 7/1985 | Schmidt et al. | 24/599.4 |
| 5,704,668 A | * | 1/1998 | Ferrato | 294/19.1 |
| 5,864,929 A | * | 2/1999 | Sakong | 24/600.1 |
| 5,927,431 A | * | 7/1999 | Klein, Jr. | 182/3 |
| 6,698,544 B2 | * | 3/2004 | Kurtgis | 182/3 |
| 6,772,488 B1 | * | 8/2004 | Jensen et al. | 24/599.6 |
| 6,907,645 B2 | * | 6/2005 | Jenson et al. | 24/599.6 |
| 7,228,601 B2 | * | 6/2007 | Thompson | 24/599.9 |
| 7,320,159 B2 | * | 1/2008 | Petzl et al. | 24/599.5 |
| 7,475,456 B2 | * | 1/2009 | Thompson | 24/599.9 |
| 7,540,074 B2 | * | 6/2009 | Thompson | 24/600.2 |
| 2003/0031203 A1 | * | 2/2003 | Fukui | 370/469 |
| 2003/0034203 A1 | * | 2/2003 | Hewlett et al. | 182/5 |
| 2003/0167608 A1 | * | 9/2003 | Petzl et al. | 24/600.2 |
| 2005/0246874 A1 | * | 11/2005 | Hsu | 24/598.2 |
| 2006/0219479 A1 | * | 10/2006 | Petzl et al. | 182/3 |
| 2006/0246874 A1 | * | 11/2006 | Sullivan | 455/412.1 |
| 2007/0215411 A1 | * | 9/2007 | Petzl et al. | 182/193 |
| 2008/0120818 A1 | * | 5/2008 | Belcourt et al. | 24/599.5 |

FOREIGN PATENT DOCUMENTS

| | | |
|---|---|---|
| DE | 42 37 263 A1 | 7/1994 |
| EP | 0 826 890 A1 | 3/1998 |
| FR | 1291 420 | 4/1962 |
| GB | 2387617 A * | 10/2003 |

\* cited by examiner

*Primary Examiner* — Katherine Mitchell
*Assistant Examiner* — Candace L Bradford
(74) *Attorney, Agent, or Firm* — Oliff & Berridge, PLC

(57) ABSTRACT

A carabiner comprises a locking part elastically biased to a locked position for automatic locking of the pivoting gate in the closed position. The locking part is associated with an actuating ring coaxially surrounding the gate and used only when opening of the carabiner is performed for the gate to pivot to the unlocked position. The first end of the fixed body comprises a ramp to automatically unlock the locking part before the gate reaches the end of closing travel.

3 Claims, 12 Drawing Sheets

_US 8,016,073 B2_

CARABINER WITH AUTOMATIC LOCKING

BACKGROUND OF THE INVENTION

The invention relates to a carabiner comprising
a fixed C-shaped body having a first end provided with a securing part,
a gate movable around a spindle between a closed position and an open position, said spindle being situated close to the second end of the body,
a first return spring biasing the gate to the closed position by engagement of the securing part in a latching part of the gate,
and a blocking device comprising a movable locking part biased by flexible means to a locked position for automatic locking of the gate in the closed position.

STATE OF THE ART

Known locking carabiners are generally equipped with screw-type or bayonet-type rings mounted coaxially on the movable gate. In the case of screw-type rings, going from the second unlocked position to the first locked position requires the ring to be screwed through several turns to move it in translation along the gate over a travel of several millimeters so as to efficiently cover the securing part of the body. This screw-tightening operation is tedious and takes a relatively long time to perform. The same drawback arises when unscrewing to make the ring go from the first locked position to the second unlocked position. In the case of a bayonet-type ring, blocking of the gate in the closed position is achieved by a first upward translational movement of the ring against the force of a spring, followed by a second limited rotational movement. After it has been released, the ring is subjected to a slight recoil movement and is kept in the first blocked position by the elastic force of the spring. Inadvertent unlocking of the ring does however still remain possible in the presence of friction forces exerted by the rope.

The document EP 826890 describes a carabiner with a locking ring that is mounted rotating around the swivelling gate. A ball-lock is integral to the gate and operates in conjunction with the rotating ring to perform positive locking of the carabiner in the closed position when the ring is actuated at the end of travel. Manual movement of the ring in rotation from the first locked position to the second unlocked position can only take place after the lock has been previously neutralized. Opening the gate of a locked carabiner therefore requires a first lock releasing command, a second rotational movement of the ring to the second unlocked position, and a third swivelling movement of the gate to the open position. The second rotational movement to unlock the ring lengthens the opening sequence and complicates handling of the carabiner.

Carabiners also exist having a ring with automatic locking of the gate when the latter reaches the closed position due to the action of a return spring. The ring can be rotary or sliding and remains in the unlocked position so long as the gate is open. It returns automatically to the locked position at the end of closing travel of the gate. When the ring is moved between the unlocked position and the locked position, it can be observed that the friction forces of the ring could hamper full closing of the gate, to the detriment of safety.

The document DE 4237263 refers to a carabiner equipped with a lock directly commanded and biased by a spring to block the gate in the closed position. The lock is integrated inside the gate, and unlocking thereof to open the carabiner requires a strong force.

OBJECT OF THE INVENTION

The object of the invention consists in improving the safety and handling of a carabiner with automatic locking of the gate.

The carabiner according to the invention is characterized in that the locking part is mounted with limited pivoting near to the latching part, being associated with an actuating ling used only for opening of the carabiner for pivoting of the gate to the unlocked position, and that the first end of the fixed body comprises means for automatically unlocking the locking part before the gate reaches the end of closing travel.

The locking part can be integral to the gate or to the actuating ring, the latter being inactive for locking but active for unlocking of the carabiner.

According to a preferred embodiment, the locking part is achieved by means of a steel wire folded into a U-shape, that is integral to the movable gate and comprises two offset half-spindles at the ends thereof to form a flexible link. The pivoting axis of the locking part extends perpendicularly to the movable gate, enabling quick manual unblocking of the locking part under the action of the ring to open the gate.

The actuating ring is preferably mounted coaxially sliding on the gate with an interposed second return spring biasing the locking part and gate to the locked position of the gate.

BRIEF DESCRIPTION OF THE DRAWINGS

Other advantages and features of the invention will become more clearly apparent from the following description, given for non-restrictive example purposes only, and represented in the accompanying drawings in which.

DESCRIPTION OF TWO PREFERRED EMBODIMENTS OF THE INVENTION

Figure 1:
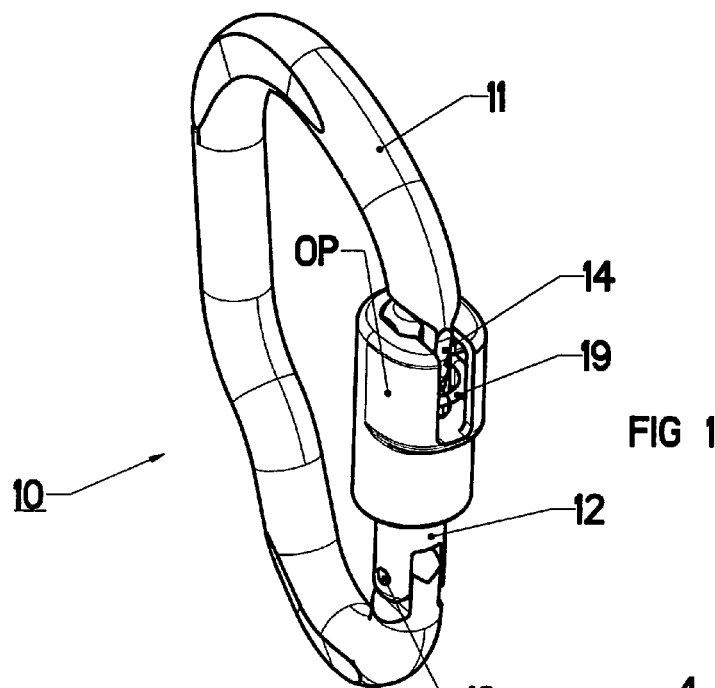
FIG. 1 is a perspective view of the carabiner according to the invention, the ring being integral to the gate and being closed and locked by the locking device formed by a folded U-shaped steel wire.
Figure 2:
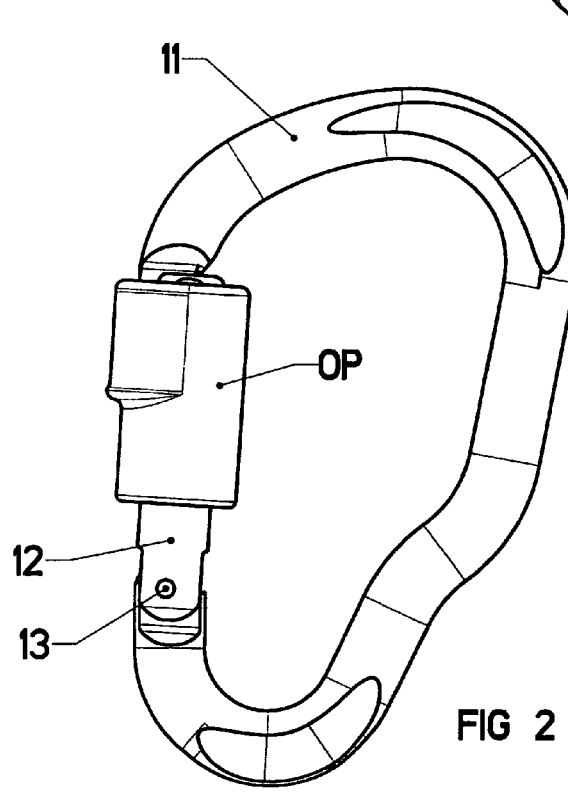
FIG. 2 shows an elevational view of FIG. 1.
Figure 3:
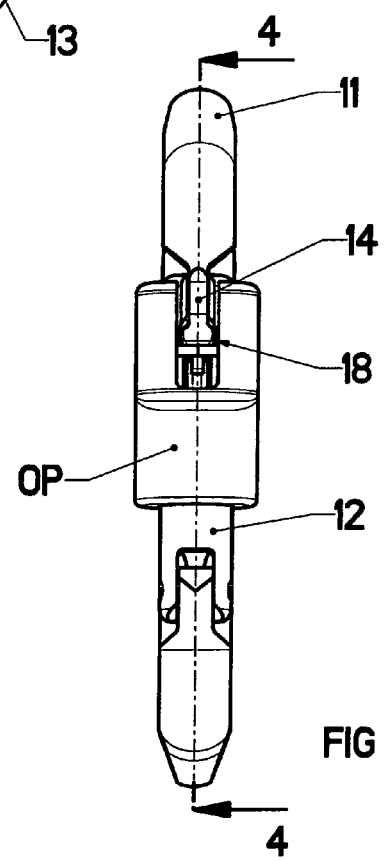
FIG. 3 is a side view of FIG. 1.
Figure 4:
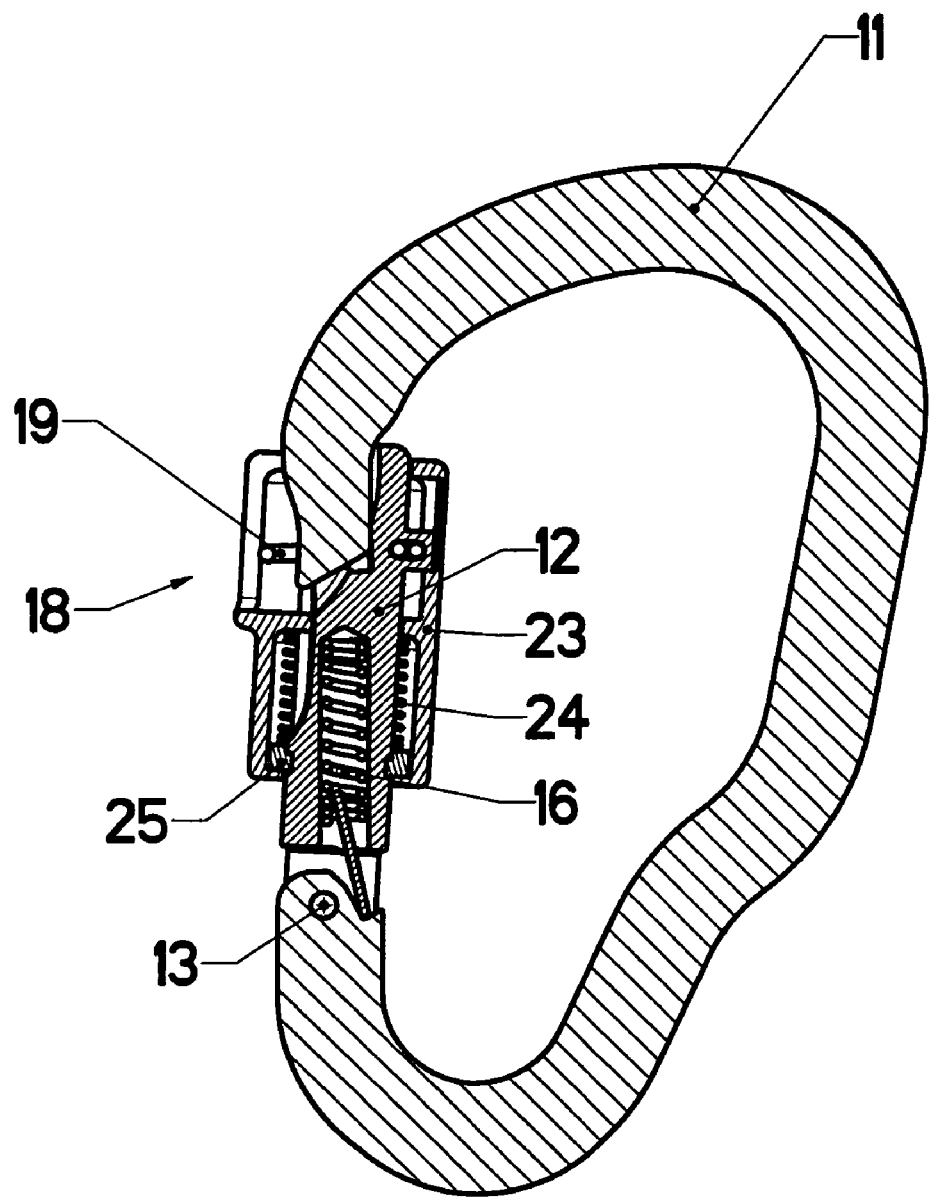
FIG. 4 is a cross-sectional view along the line 4-4 of FIG. 3, the gate being closed and locked.
Figure 5:
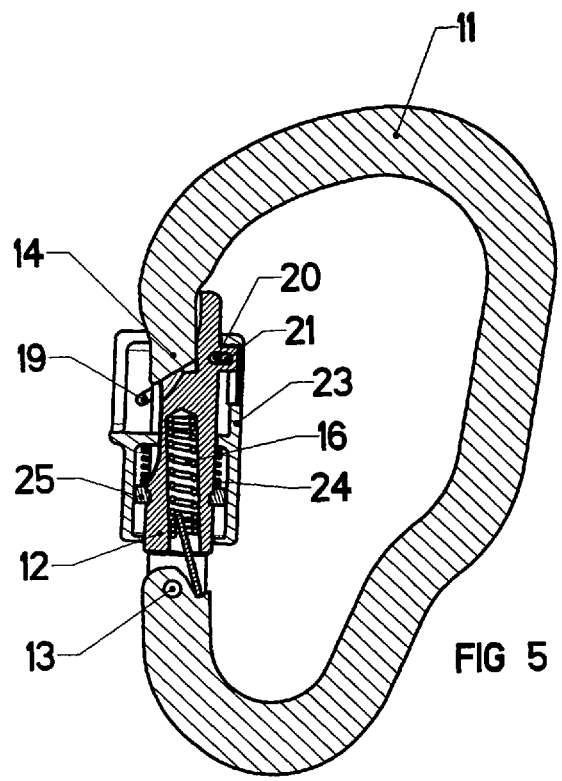
FIG. 5 is an identical view to FIG. 4 when the gate is closed and the blocking device is in the unlocked position following lowering of the ring.
Figure 6:
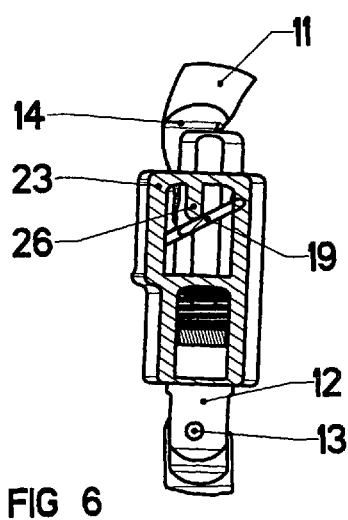
FIG. 6 is a partial cross-sectional view of FIG. 5 showing the spigot of the ring coming into engagement against the locking part to unlock the latter.
Figure 7:
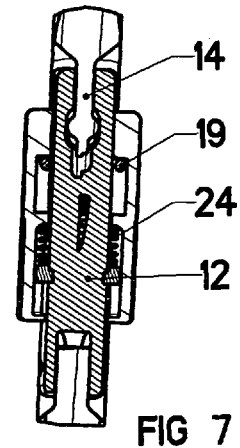
FIG. 7 is a partial cross-sectional view of FIG. 5 showing unlocking of the gate to enable the latter to be opened.
Figure 8:
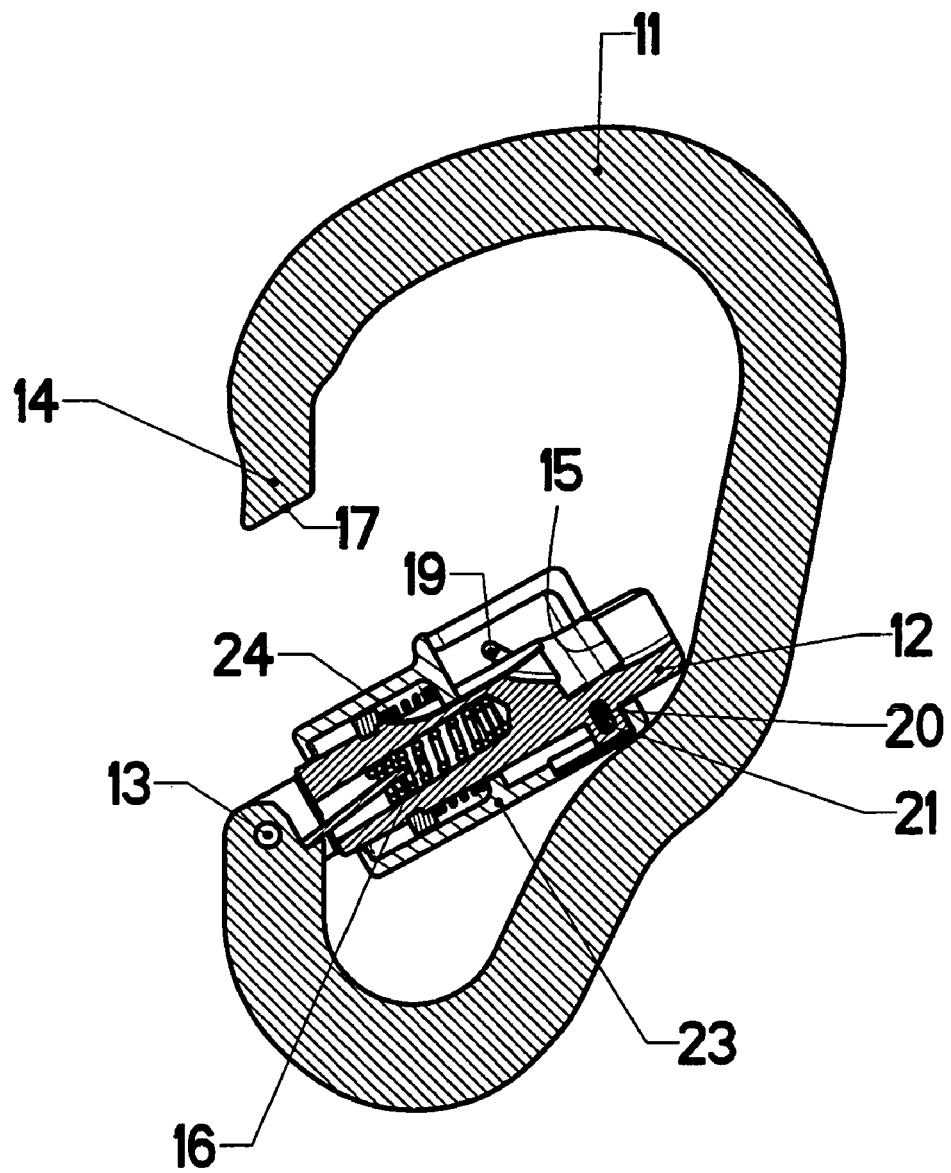
FIGS. 8 and 9 are identical views to FIG. 5 in the open position of the gate respectively before and after the actuating ring has returned to the locked position.

In FIGS. 1 to 10, a carabiner 10 for climbing and mountaineering comprises a C-shaped metal body 11 and a movable gate 12 mounted swivelling around a spindle 13 situated at the bottom end of the body 11. The top first end of the body 11 is provided with a male securing part 14 able to engage in a female latching part 15 of the gate 12 when returning to the closed position due to the action of a first return spring 16. The male securing part 14 presents for example a reverse T-shaped structure comprising a tab extended by a protuberance in the form of a cap. A ramp 17 is arranged at the end of the top first end of the male securing part 14. The female latching part 15 of the gate 12 is situated opposite the pivoting spindle 13, and comprises a recess of conjugate shape to the male part 14.

The carabiner 10 is equipped with a blocking device 18 for automatic locking of the gate 12 in the closed position. It comprises a locking part 19 mounted with limited pivoting close to the latching part 15 with a flexible link biasing said part to a locked position when the gate 12 is in the closed position.

For example, the locking part 19 is achieved by means of a steel wire folded into a U-shape that comprises at the ends thereof two offset half-spindles 20, 21 engaged diametrically in a boss of the movable gate 12 to form the flexible pivoting link. The pivoting axis of the locking part 19 extends perpendicularly to the movable gate 12.

In the closed locked position (FIGS. 1 to 4), the locking part 19 is facing the protuberance of the male part 14, which prevents any inward pivoting of the gate 12 when a pushing action is exerted perpendicularly with respect to the longitudinal direction of the gate 12. A slight clearance separates the gate 12 from the folded intermediate part of the wire so as to allow friction-less pivoting movement of the locking part 19 between the locked position and the unlocked position, and vice-versa.

The locking part 19 is advantageously equipped with a gripping means OP to facilitate the pivoting movement of the gate to the unlocked position. The gripping means OP can for example be formed by an actuating ring 23 coaxially mounted sliding on the gate 12 with an interposed second return spring 24 biasing the ring 23 to the locked position when the gate 12 is closed. The second return spring 24 is formed by a compression spring pressing against a fixed stop 25 embedded in the gate 1.

Figure 9:
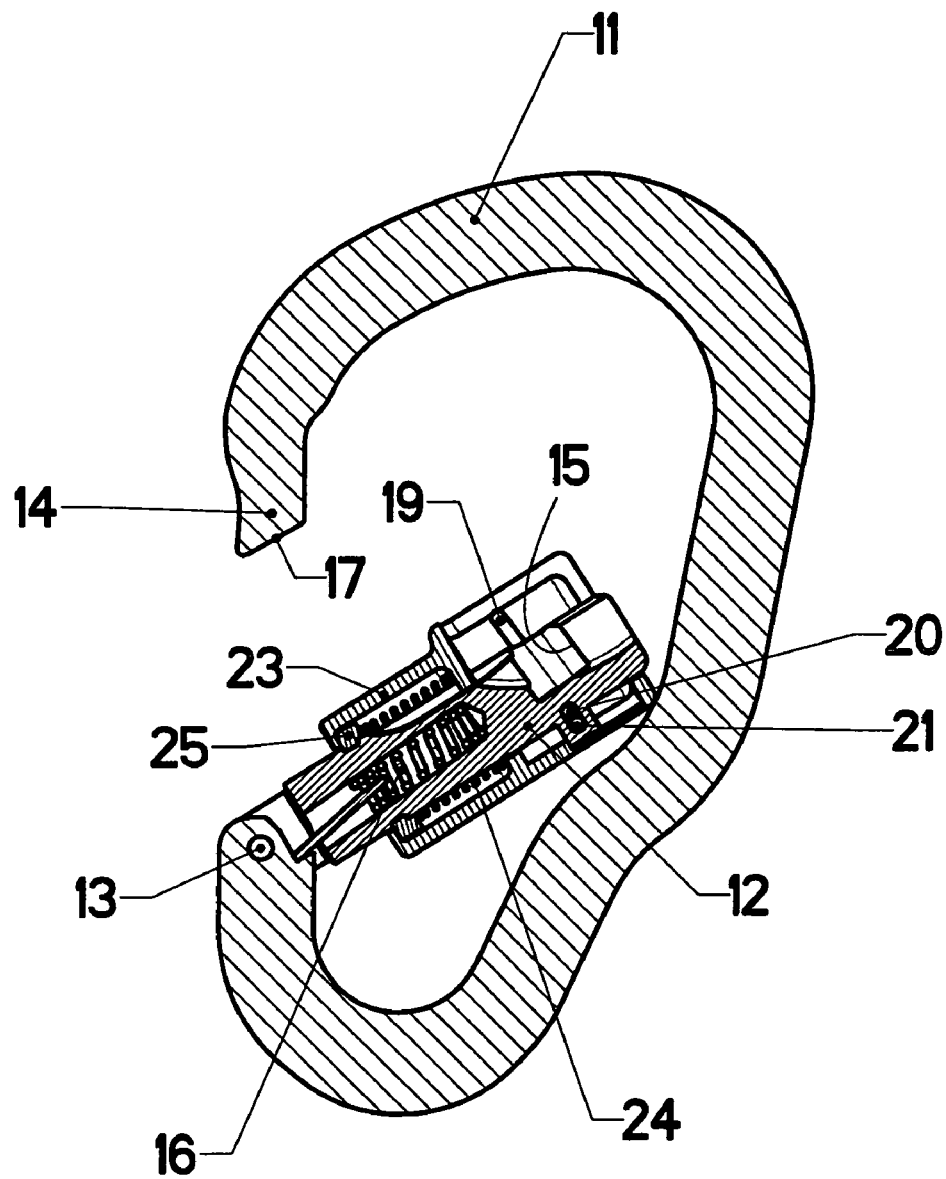
Figure 10:
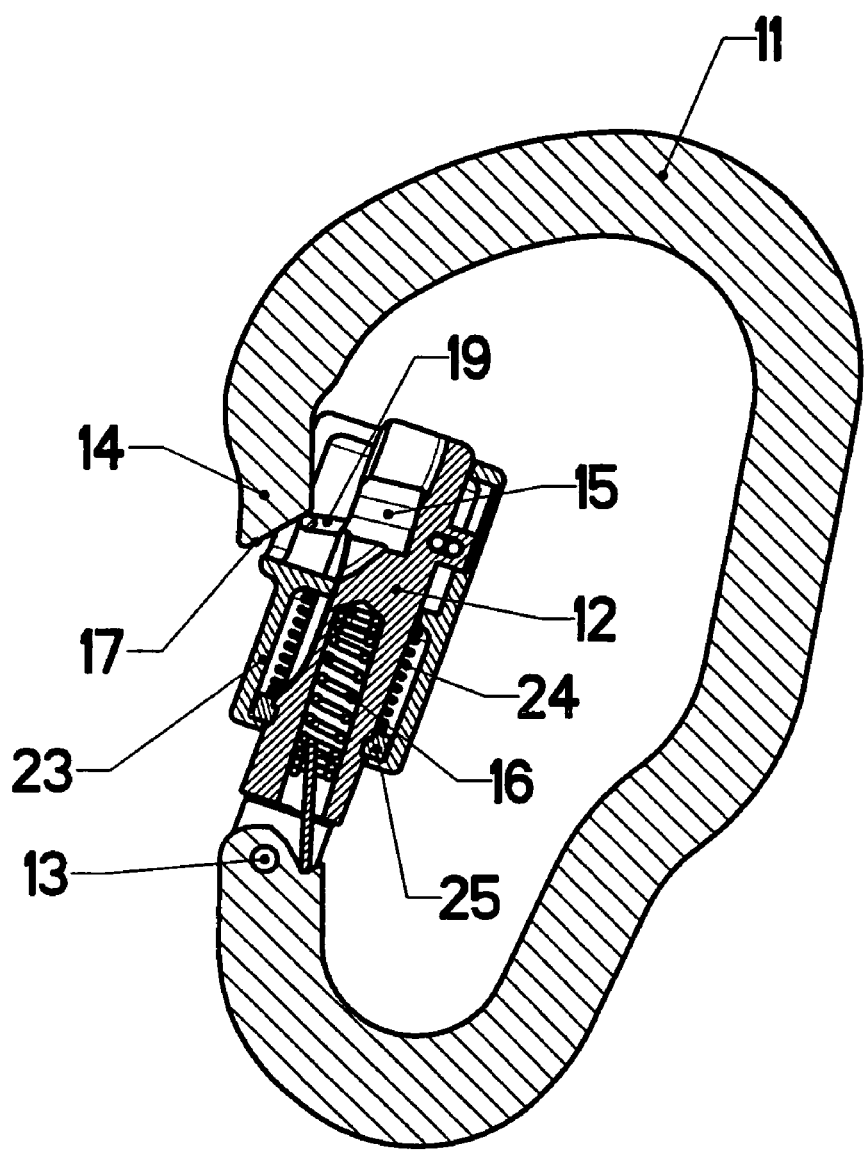
FIG. 10 represents an identical view to FIG. 9 when the gate returns to the closed position, the blocking device being automatically unlocked by a ramp of the body before the end of closing travel.
Figure 11:
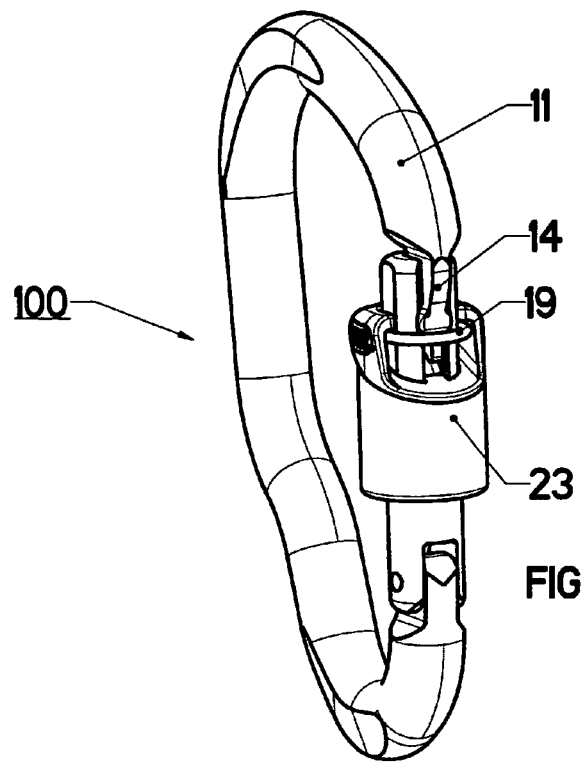
FIG. 11 shows a perspective view of an alternative embodiment of FIG. 1 wherein the locking part is integral to the sliding actuating ring.
Figure 12:
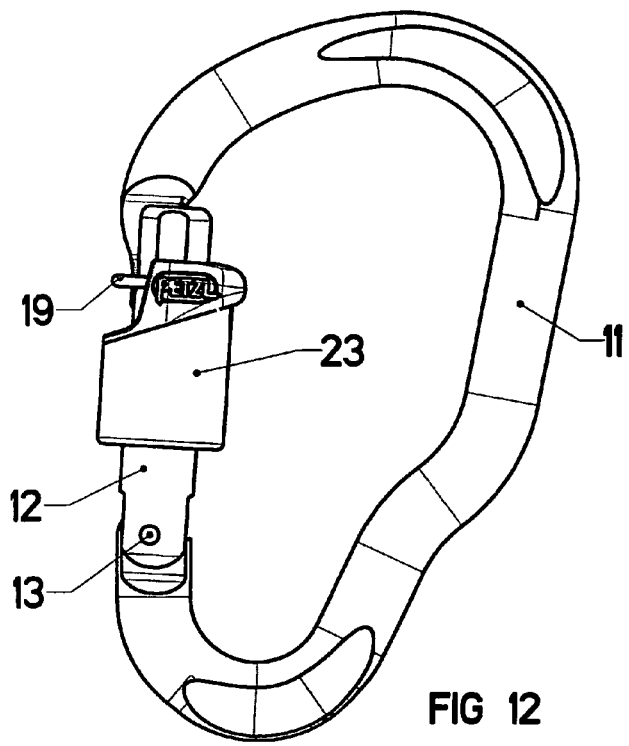
FIG. 12 is an elevation of FIG. 11.
Figure 13:
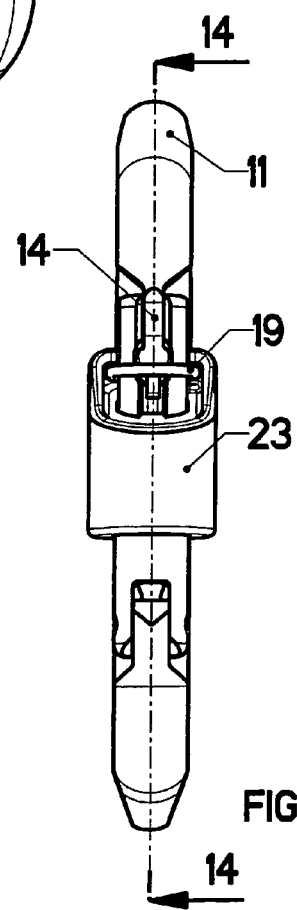
FIG. 13 is a side view of FIG. 12.
Figure 14:
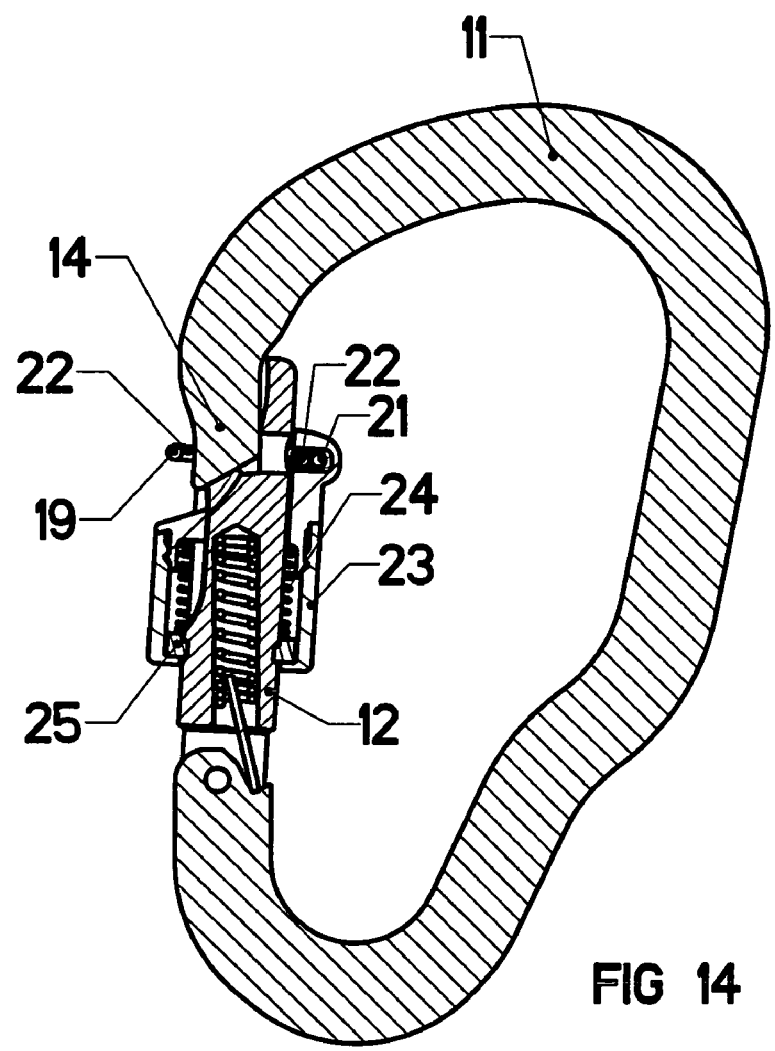
FIG. 14 is a cross-sectional view along the line 14-14 of FIG. 13, the gate being closed and locked.

To perform opening of the gate 12, the actuating ring 23 simply has to be pulled downwards to make the locking part 19 pivot manually in the same direction in the direction of the unlocked position (FIGS. 6 and 7) by pushing a spigot 26. The wire frees the protuberance of the male part 14 allowing the gate 12 to be opened by a pushing action making the gate 12 pivot around the spindle 13 to the open position of FIG. 8. In this position, the locking part 19 returns flexibly to the locked position as soon as the manual unlocking action is released (FIG. 9).

Reclosing of the movable gate 12 takes place automatically following expansion of the first return spring 16 after the gate 12 has been released. The ramp 17 makes the locking part 19 pivot automatically downwards before the gate 12 reaches the end of closing travel see FIG. 10).

In the closed position (FIGS. 3 and 4), the locking part 19 moves up to face the protuberance of the male part 14 to lock the carabiner 10 in the closed position.

According to an alternative embodiment of the carabiner 100 illustrated in FIGS. 11 to 18, the same reference numbers will be used to designate identical or similar parts.

The locking part 19, instead of being fixed onto the gate 12, is in this case integral to the actuating ring 23 coaxially surrounding the gate 12.

Operation of the carabiner 100 according to FIGS. 11 to 18 is as follows.

In the closed locked position of the gate 12 (FIGS. 11 to 14), the actuating ring 23 is in the raised position and the locking part 19 is facing the protuberance of the male part 14 with the clearance 22 interposed. It prevents any pivoting movement of the gate 12 towards the inside of the body 11. This closed locked position is stable.

Figure 15:
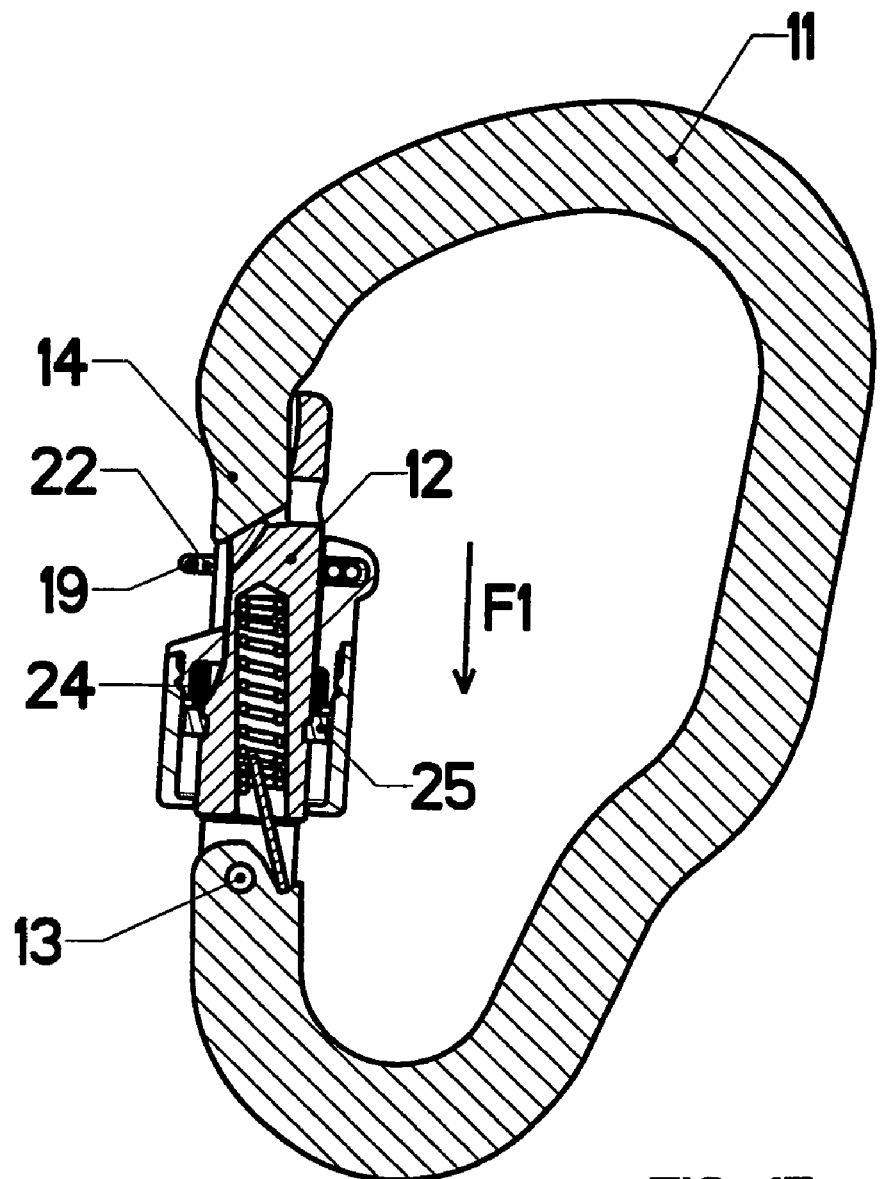
FIG. 15 is an identical view to FIG. 14, after manual sliding of the ring and the blocking device in the direction of the arrow F1 for unlocking of the gate in the closed position.

FIG. 15 illustrates the closed unlocked position of the gate 12 following the translational movement (arrow F1) of the actuating ring 23 to the unlocked position. This downward translation of the ring 23 takes place against the force of the second return spring 24 and causes the locking part 19 to escape.

Figure 16:
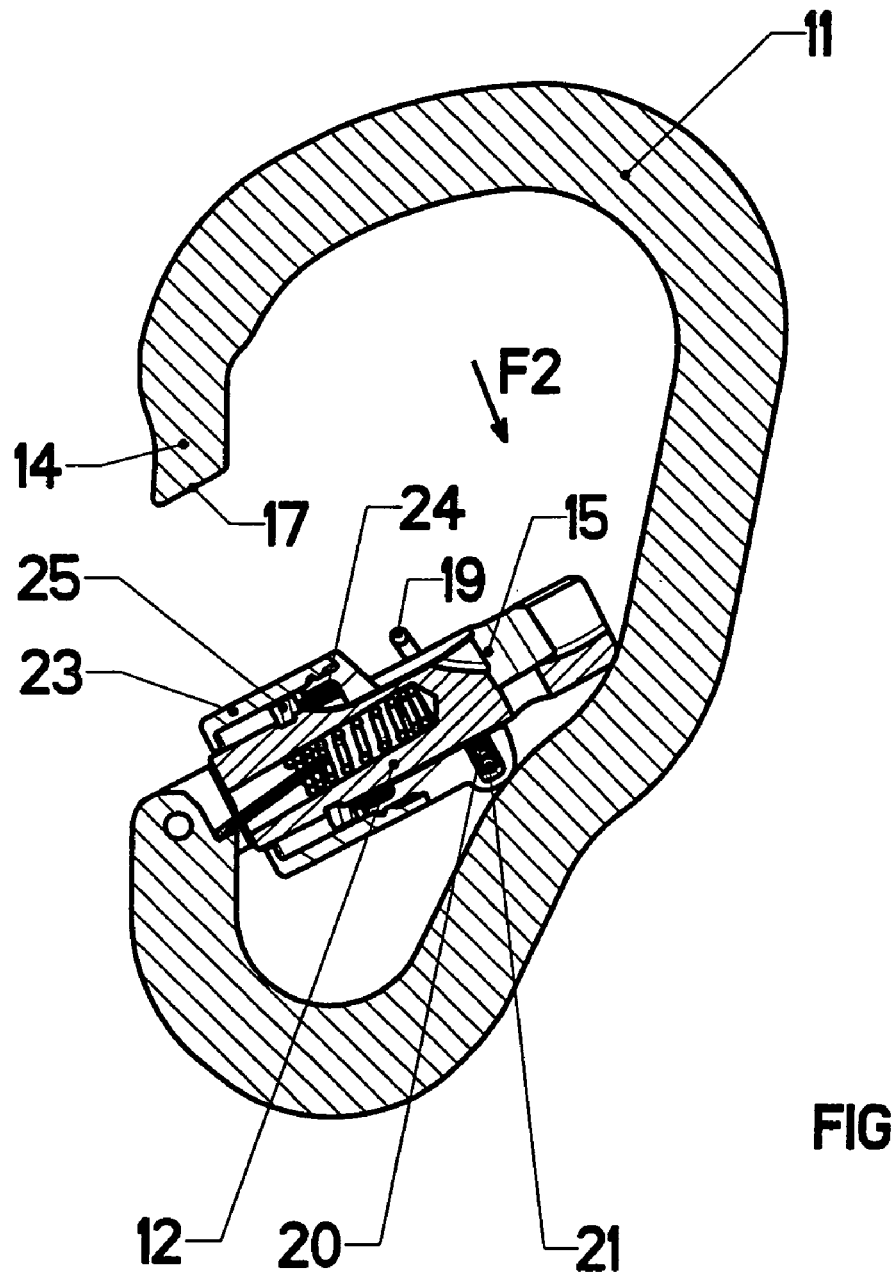
FIG. 16 shows an identical view to FIG. 15 after opening of the gate, the ring being in the down position with compression of the second return spring.

The gate 12 can now be made to pivot (arrow F2) to the open position (FIG. 16).

Figure 17:
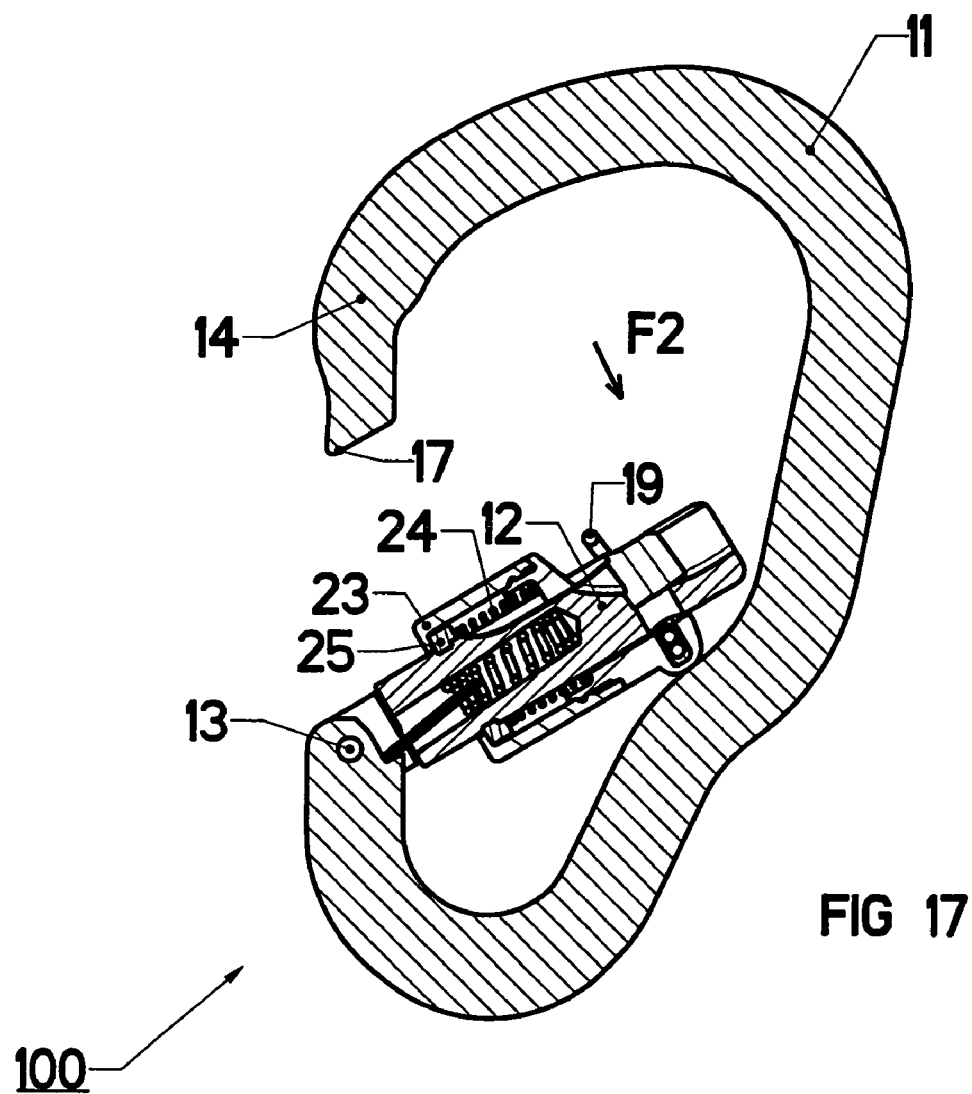
FIG. 17 is an identical view to FIG. 16 after complete opening of the gate and following return of the ring and the blocking device to the up position after relaxation of the return spring.

The locking part 19 then moves in translation with the ring 23 to the locked position due to the relaxation action of the second spring (FIG. 17).

Figure 18:
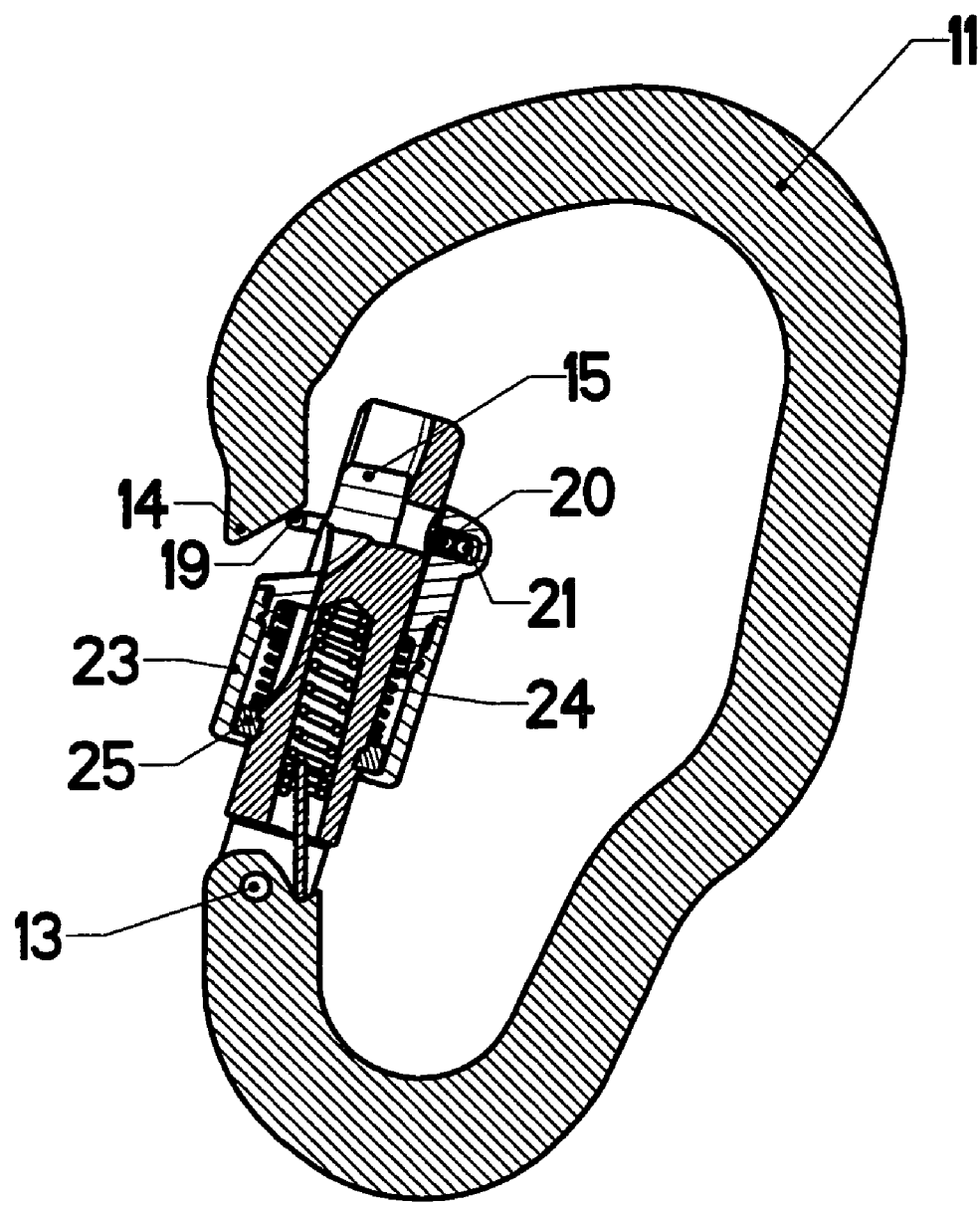
FIG. 18 is an identical view to FIG. 17 when the gate returns to the closed position, the blocking device being automatically unlocked by a ramp of the body before the end of closing travel.

After the opening force has been released, the first return spring 16 automatically returns the movable gate 12 to the closed position (FIG. 18). To allow closing, the ramp 17 makes the locking part 19 pivot automatically downwards before the gate 12 reaches the end of closing travel.

The invention claimed is:

1. A carabiner for climbing and mountaineering, comprising:
    a fixed C-shaped body having a first end provided with a securing part;
    a gate movable around a spindle between a closed position and an open position, said spindle being situated close to a second end of the body;
    a first return spring biasing the movable gate to the closed position by engagement of the securing part in a latching part of the movable gate;
    a blocking device comprising a movable locking part biased by flexible return means to a locked position, the blocking device automatically locking the movable gate in the closed position, said movable locking part being mounted with pivoting movement near to the latching part, and being associated with an actuating ring used only for opening of the carabiner by pivoting of the movable gate to the unlocked position; and
    means located at the first end of the fixed body for automatically unlocking the movable locking part before the movable gate reaches the end of closing travel, said means being formed by a ramp located at an end of the first end of the fixed body, the ramp being configured to engage the movable locking part, wherein said movable locking part comprises a steel wire folded into a U-shape, with two offset half-spindles at the ends thereof to form said flexible return means, and said movable locking part (1) is directly attached to the movable gate for movement with the movable gate, (2) independently pivots relative to the movable gate, and (3) is attached to said actuating ring for movement with the actuating ring, the actuating ring coaxially surrounding the movable gate, the actuating ring being configured such that a displacement of the actuating ring causes the movable locking part to be moved to an unlocked state, and
the actuating ring is mounted coaxially sliding on the movable gate with an interposed second return spring biasing the movable locking part and the actuating ring to the locked position of the movable gate.

2. Carabiner according to claim 1, wherein the pivoting axis of the movable locking part extends perpendicularly to the movable gate.

3. Carabiner according to claim 1, wherein the second return spring is formed by a compression spring pressing against a fixed stop of the movable gate.

* * * * *